US012145024B1

(12) United States Patent
Gregory

(10) Patent No.: US 12,145,024 B1
(45) Date of Patent: Nov. 19, 2024

(54) PORTABLE THERAPY CHAIR

(71) Applicant: Wesley Gregory, Highland Springs, VA (US)

(72) Inventor: Wesley Gregory, Highland Springs, VA (US)

( * ) Notice: Subject to any disclaimer, the term of this patent is extended or adjusted under 35 U.S.C. 154(b) by 825 days.

(21) Appl. No.: 17/347,650

(22) Filed: Jun. 15, 2021

(51) Int. Cl.

| | |
|---|---|
| ***A63B 22/06*** | (2006.01) |
| ***A61G 5/02*** | (2006.01) |
| ***A61G 5/08*** | (2006.01) |
| ***A61G 5/10*** | (2006.01) |
| ***A61G 5/12*** | (2006.01) |
| ***A63B 23/04*** | (2006.01) |
| ***A63B 24/00*** | (2006.01) |

(52) U.S. Cl.
CPC .............. *A63B 22/06* (2013.01); *A61G 5/025* (2013.01); *A61G 5/08* (2013.01); *A61G 5/1091* (2016.11); *A61G 5/125* (2016.11); *A63B 23/04* (2013.01); *A61G 5/021* (2013.01); *A61G 2203/70* (2013.01); *A61G 2210/00* (2013.01); *A63B 2024/0093* (2013.01)

(58) Field of Classification Search
CPC . A63B 22/06; A63B 23/04; A63B 2024/0093; A61G 5/125; A61G 5/1091; A61G 5/025; A61G 5/08; A61G 5/021; A61G 2203/70; A61G 2210/00
See application file for complete search history.

(56) References Cited

U.S. PATENT DOCUMENTS

| | | | | |
|---|---|---|---|---|
| 3,738,649 | A | 6/1973 | Miller | |
| 4,805,901 | A * | 2/1989 | Kulick | A63B 21/0055 297/118 |
| 4,862,875 | A | 9/1989 | Heaton | |
| 5,518,474 | A | 5/1996 | Barksdale | |
| 6,368,260 | B1 | 4/2002 | Crews | |
| 2009/0105046 | A1 | 4/2009 | Rudich | |
| 2011/0034302 | A1 * | 2/2011 | Zlobinsky | A63B 21/00069 482/8 |
| 2012/0078142 | A1 | 3/2012 | Fenkell | |
| 2012/0329611 | A1 | 12/2012 | Bouchard | |

FOREIGN PATENT DOCUMENTS

| | | | | |
|---|---|---|---|---|
| CA | 2781333 | | 12/2012 | |
| CN | 205459436 U | * | 8/2016 | |
| CN | 108095918 A | * | 6/2018 | A61G 5/04 |
| CN | 110037894 A | * | 7/2019 | A61H 1/0237 |
| CN | 219983247 U | * | 11/2023 | |
| WO | 2011119902 | | 9/2011 | |
| WO | WO-2018163395 A1 | * | 9/2018 | A61H 39/00 |

* cited by examiner

*Primary Examiner* — Sundhara M Ganesan
*Assistant Examiner* — Jacqueline N L Loberiza
(74) *Attorney, Agent, or Firm* — Kyle A. Fletcher, Esq.

(57) ABSTRACT

The portable therapy chair is a wheelchair. The portable therapy chair is an exercise device used by a patient. The patient sits in the portable therapy chair to exercise. The portable therapy chair provides a counterforce for use by the patient during leg exercises. The portable therapy chair comprises a seat, a plurality of resistance pedals, and an assistance circuit. The plurality of resistance pedals and the assistance circuit attaches to the seat. The seat is a collapsible structure such that the volume of the portable therapy chair reduces for transport. The patient moves the plurality of resistance pedals. The plurality of resistance pedals provides a counterforce against the movement by the patient. The assistance circuit is an electric circuit. The assistance circuit generates the counterforce provided to the patient.

19 Claims, 4 Drawing Sheets

PORTABLE THERAPY CHAIR

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of physical training, more specifically, an exercise apparatus for strengthening muscles by working against a counterforce. (A63B21/00)

SUMMARY OF INVENTION

The portable therapy chair is a wheelchair. The portable therapy chair is adapted for use with a patient. The portable therapy chair is an exercise device. The patient sits in the portable therapy chair to exercise. The portable therapy chair provides a counterforce for use by the patient during leg exercises. The portable therapy chair comprises a seat, a plurality of resistance pedals, and an assistance circuit. The plurality of resistance pedals and the assistance circuit attaches to the seat. The seat is a collapsible structure such that the volume of the portable therapy chair reduces for transport. The patient moves the plurality of resistance pedals. The plurality of resistance pedals provides a counterforce against the movement by the patient. The assistance circuit is an electric circuit. The assistance circuit controls the counterforces provided to the patient. The assistance circuit generates an audible alarm that indicates that the patient is in difficulty.

These together with additional objects, features and advantages of the portable therapy chair will be readily apparent to those of ordinary skill in the art upon reading the following detailed description of the presently preferred, but nonetheless illustrative, embodiments when taken in conjunction with the accompanying drawings.

In this respect, before explaining the current embodiments of the portable therapy chair in detail, it is to be understood that the portable therapy chair is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the portable therapy chair.

It is therefore important that the claims be regarded as including such equivalent construction insofar as they do not depart from the spirit and scope of the portable therapy chair. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
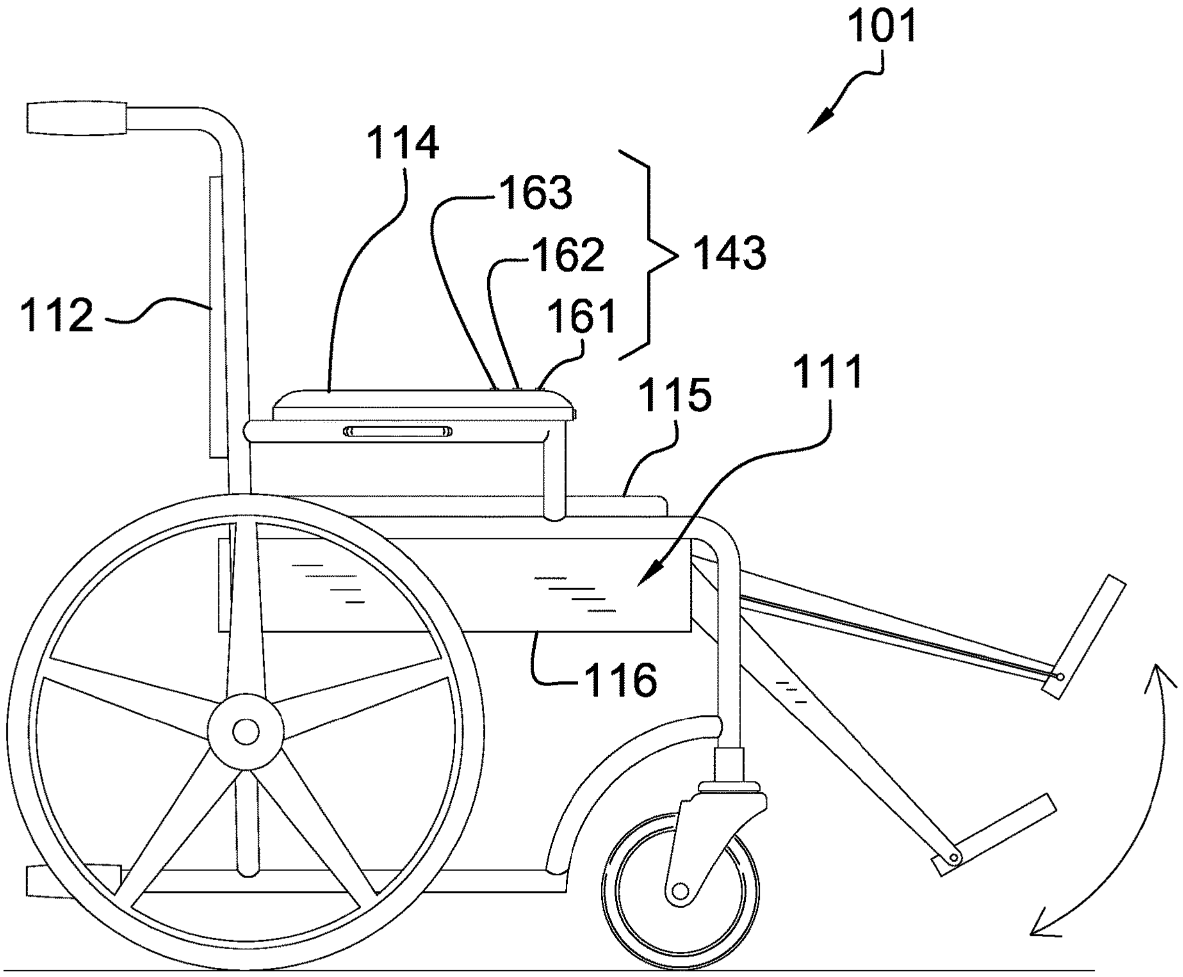
FIG. 1 is a side view of an embodiment of the disclosure.
Figure 2:
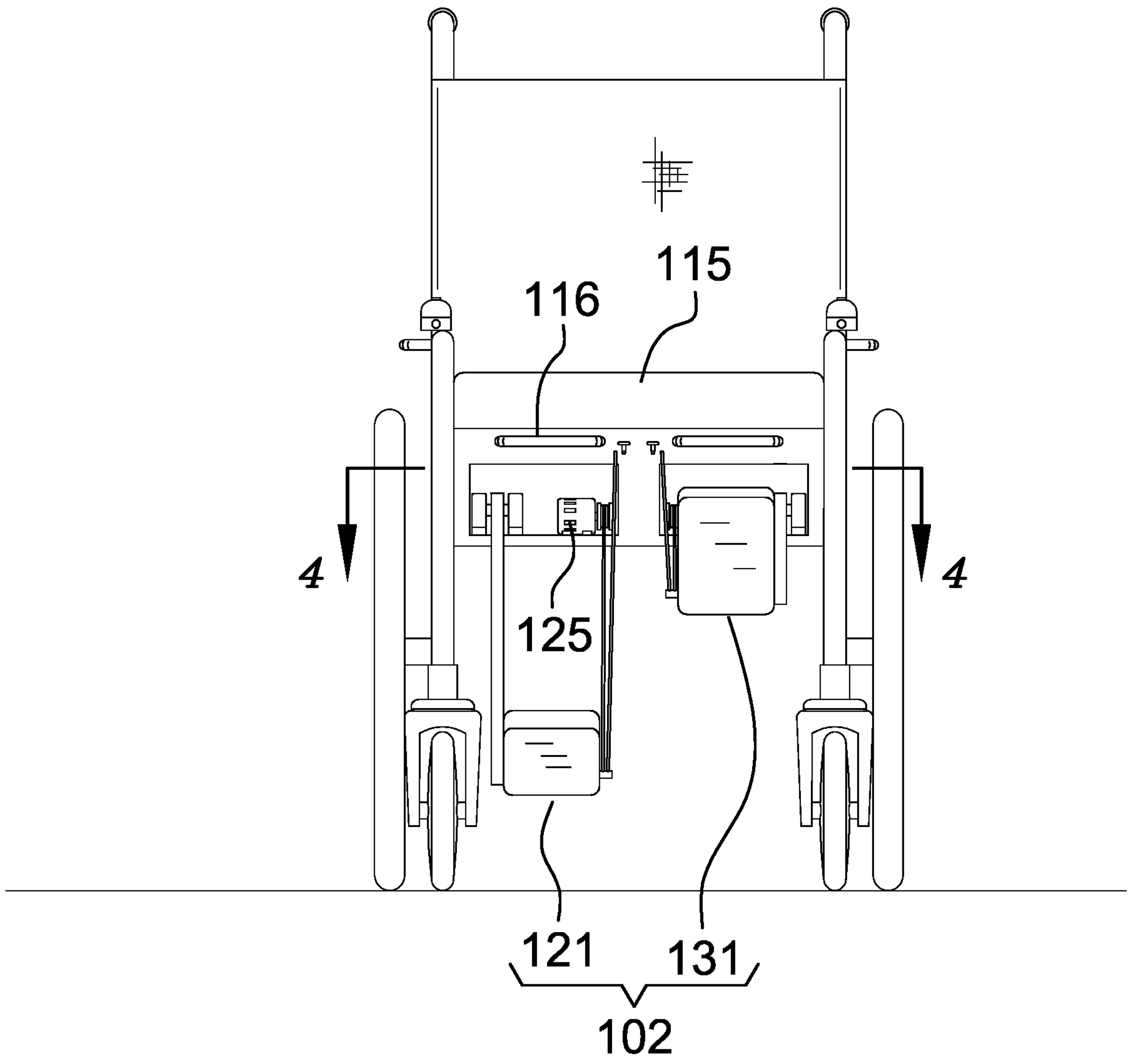
FIG. 2 is a rear view of an embodiment of the disclosure.
Figure 3:
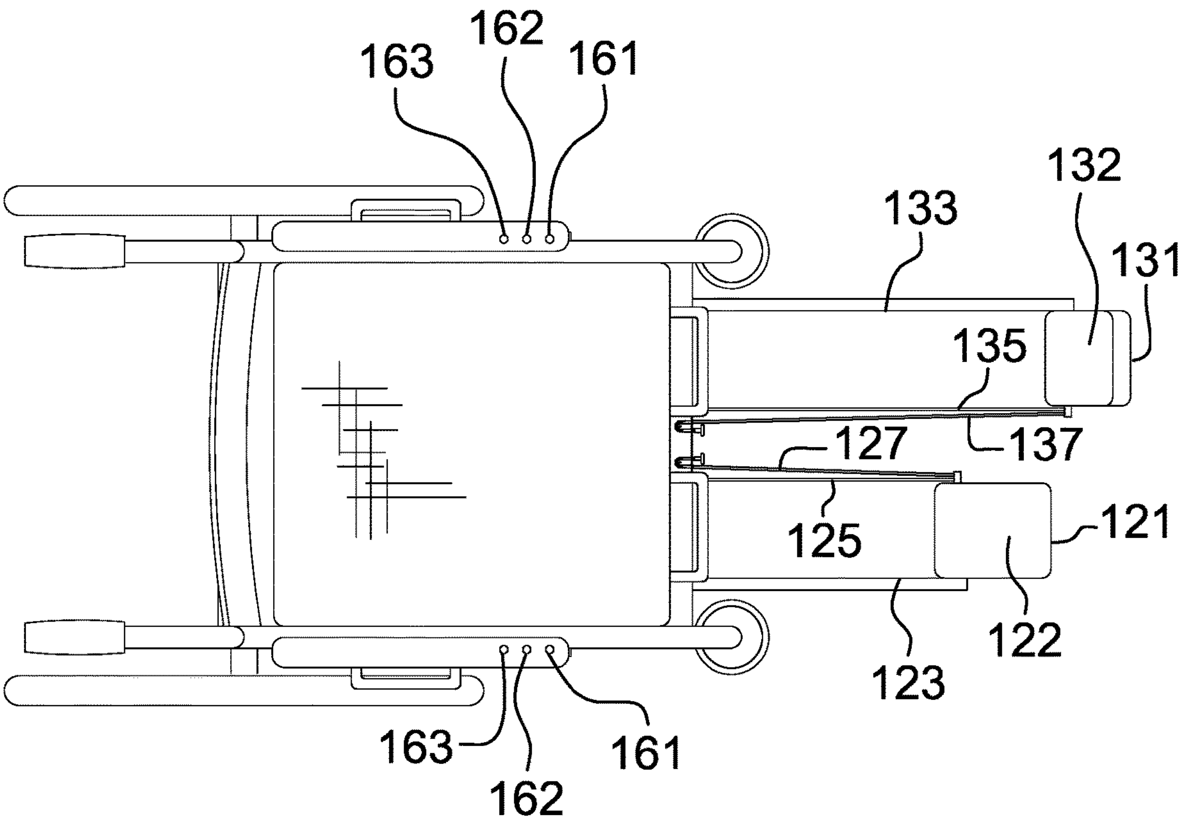
FIG. 3 is a top schematic view of an embodiment of the disclosure.
Figure 4:
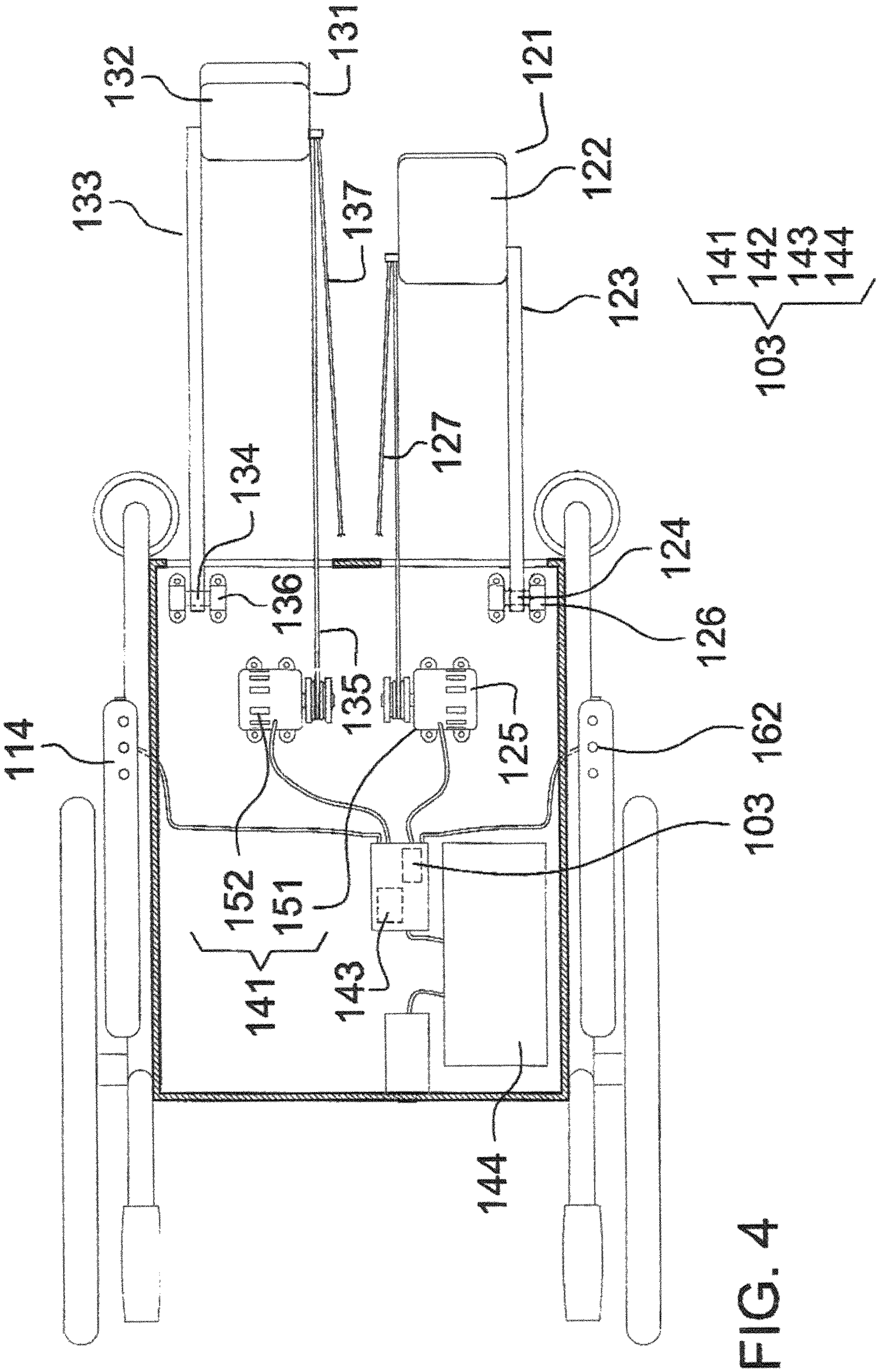
FIG. 4 is a detail view of an embodiment of the disclosure.

Detailed reference will now be made to one or more potential embodiments of the disclosure, which are illustrated in FIGS. 1 through 4.

The portable therapy chair 100 (hereinafter invention) is a wheelchair. The invention 100 is adapted for use with a patient 104. The invention 100 is an exercise device. The patient 104 sits in the invention 100 to exercise. The invention 100 provides a counterforce for use by the patient 104 during leg exercises.

The invention 100 comprises a seat 101, a plurality of resistance pedals 102, and an assistance circuit 103. The plurality of resistance pedals 102 and the assistance circuit 103 attaches to the seat 101. The seat 101 is a collapsible structure such that the volume of the invention 100 reduces for transport. The patient 104 moves the plurality of resistance pedals 102. The terms therapeutic chair and the patient 104 are defined elsewhere in this disclosure. The plurality of resistance pedals 102 provides a counterforce against the movement by the patient 104. The assistance circuit 103 is an electric circuit. The assistance circuit 103 controls the counterforces provided the patient 104 during the leg exercises. The assistance circuit 103 generates an audible alarm that indicates that the patient 104 is in difficulty.

The seat 101 forms the wheelchair. The seat 101 is defined elsewhere in this disclosure. The seat 101 is adapted for use by the patient 104. The patient 104 sits in the seat 101 during the therapeutic process. The elevation of the seat 101 is adjustable. The elevation of the seat 101 adjusts to accommodate the needs of the patient 104. The elevation of the seat 101 adjusts to collapse the seat 101 for transport. The seat 101 comprises a bench 111, a backrest 112, and a plurality of armrests 114. The backrest 112 attaches to the bench 111. The plurality of armrests 114 attach to the bench 111.

The bench 111 is a disk-shaped structure. The bench 111 forms a horizontally oriented surface. The patient 104 sits on the bench 111. The patient 104 sits on the bench 111 during the therapeutic process. The bench 111 elevates the patient 104 such that the patient 104 can rotate the plurality of resistance pedals 102 during the therapeutic process. The bench 111 is defined elsewhere in this disclosure. The bench 111 further comprises a superior surface 115 and an inferior surface 116.

The superior surface 115 is the horizontally oriented surface of the bench 111 with the second greatest surface area. The superior surface 115 forms the superior face of the disk structure of the bench 111. The superior surface 115 forms the face of the disk structure of the bench 111 that is distal from the inferior surface 116. The patient 104 rests on the superior surface 115. The inferior surface 116 is the horizontally oriented surface of the bench 111 with the greatest surface area. The inferior surface 116 forms the inferior face of the disk structure of the bench 111. The inferior surface 116 forms the face of the disk structure of the bench 111 that is distal from the superior surface 115. The inferior surface 116 is the face of the disk structure of the bench 111 that is proximal to the supporting surface.

The backrest 112 is a roughly vertically oriented structure. The backrest 112 is adapted to support the back of the patient 104 when the patient 104 sits in the seat 101. The backrest 112 provides the patient 104 with a surface to push against during the therapeutic process.

Each of the plurality of armrests 114 is a roughly horizontally-oriented structure. Each of the plurality of armrests 114 has a roughly perpendicular orientation relative to the backrest 112. The plurality of armrests 114 is adapted to support the arms of the patient 104 when the patient 104 sits in the seat 101. The plurality of armrests 114 provides the patient 104 with a surface to push against during the therapeutic process.

Each of the plurality of resistance pedals 102 is a rotating structure. Each of the plurality of resistance pedals 102 generates a counterforce. The patient 104 rotates each of the plurality of resistance pedals 102 during the therapeutic process. Each of the plurality of resistance pedals 102 presents the counterforce to the patient 104 as the patient 104 rotates the plurality of resistance pedals 102 during the therapeutic process. Each resistance pedal selected from the plurality of resistance pedals 102 attaches to the inferior surface 116 of the bench 111 of the seat 101 such that the selected resistance pedal rotates relative to the bench 111. The plurality of resistance pedals 102 comprises a first resistance pedal 121 and a second resistance pedal 131.

The first resistance pedal 121 is a mechanical device. The first resistance pedal 121 attaches to the inferior surface 116 of the bench 111 of the seat 101. The first resistance pedal 121 is adapted for use by the patient 104 during the therapeutic process. The first resistance pedal 121 rotates relative to the bench 111. The patient 104 rotates the first resistance pedal 121 during the therapeutic process. The first resistance pedal 121 comprises a first pedal 122, a first lever 123, a first pivot pin 124, a first resistance structure 125, a first mounting structure 126, and a first override winch 127. The first resistance structure 125 of the first resistance pedal 121 generates the counterforce that opposes the rotation of the first resistance pedal 121 by the patient 104 during the therapeutic process.

The first pedal 122 is a disk-shaped structure. The first pedal 122 is a rigid structure. The first pedal 122 is sized to receive the foot of the patient 104. The patient 104 rotates the first resistance pedal 121 by pressing the foot against the first pedal 122. The first pedal 122 forms a rigid structure with the first lever 123. The first pedal 122 attaches to the end of the first lever 123 that is distal from the first pivot pin 124.

The first lever 123 is a prism-shaped structure. The first lever 123 is a rigid structure. The first pedal 122 attaches to a congruent end of the prism structure of the first lever 123 such that the congruent ends of the disk structure of the first pedal 122 are perpendicular to the center axis of the first lever 123. The first lever 123 attaches the first pivot pin 124 to the first pedal 122. The first lever 123 attaches to the first pivot pin 124 such that the first lever 123 and the first pedal 122 rotate relative to the bench 111. The first lever 123 forms an extension structure. The first lever 123 extends the reach between the first pedal 122 and the first pivot pin 124 such that the first resistance pedal 121 can be rotated by the foot of the patient 104.

The first pivot pin 124 is a prism-shaped structure. The first pivot pin 124 is a rotating structure. The first pivot pin 124 rotates such that the center axis of the prism structure of the first pivot pin 124 aligns with the axis of rotation of the first pivot pin 124. The congruent end of the prism structure of the first lever 123 that is distal from the first pedal 122 attaches to the lateral face of the first pivot pin 124 such that the first lever 123 rotates relative to the bench with the rotation of the first pivot pin 124.

The first resistance structure 125 is a mechanical structure. The first resistance structure 125 comprises a first motor 151, a first spool 201, and a first cable 202. The first spool 201 secures the first cable 202 to the first motor 151. The first motor 151 rotates the first spool 201 such that the first cable 202 is deployed from and retracted onto the first spool 201. The first motor 151 maintains a tension on the first cable 202 that generates the counterforce applied to the first resistance pedal 121.

The first mounting structure 126 is a mechanical structure. The first mounting structure 126 physically attaches the first pivot pin 124 and the first resistance structure 125 to the inferior surface 116 of the bench 111. The first mounting structure 126 attaches the first pivot pin 124 to the first lever 123 such that the first lever 123 rotates freely within the first mounting structure 126.

The first override winch 127 is a manually operated winch. The winch is defined elsewhere in this disclosure. The first override winch 127 operates in parallel with the first resistance structure 125 such that the first override winch 127 can take over in the event of the failure of the first resistance structure 125. In this circumstance, the tension provided by the first resistance structure 125 is manually transferred to the first override winch 127 before the first resistance structure is removed from the load path of the first resistance pedal 121. The first override winch 127 then manually operated to prevent rapid changes in the counterforce provided to the first resistance pedal 121.

The second resistance pedal 131 is a mechanical device. The second resistance pedal 131 attaches to the inferior surface 116 of the bench 111 of the seat 101. The second resistance pedal 131 is adapted for use by the patient 104 during the therapeutic process. The second resistance pedal 131 rotates relative to the bench 111. The patient 104 rotates the second resistance pedal 131 during the therapeutic process. The second resistance pedal 131 comprises a second pedal 132, a second lever 133, a second pivot pin 134, a second resistance structure 135, a second mounting structure 136, and a second override winch 137. The second resistance structure 135 of the second resistance pedal 131 generates the counterforce that opposes the rotation of the second resistance pedal 131 by the patient 104 during the therapeutic process.

The second pedal 132 is a disk-shaped structure. The second pedal 132 is a rigid structure. The second pedal 132 is sized to receive the foot of the patient 104. The patient 104 rotates the second resistance pedal 131 by pressing the foot against the second pedal 132. The second pedal 132 forms a rigid structure with the second lever 133. The second pedal 132 attaches to the end of the second lever 133 that is distal from the second pivot pin 134.

The second lever 133 is a prism-shaped structure. The second lever 133 is a rigid structure. The second pedal 132 attaches to a congruent end of the prism structure of the second lever 133 such that the congruent ends of the disk structure of the second pedal 132 are perpendicular to the center axis of the second lever 133. The second lever 133 attaches the second pivot pin 134 to the second pedal 132. The second lever 133 attaches to the second pivot pin 134 such that the second lever 133 and the second pedal 132 rotate relative to the bench 111. The second lever 133 forms an extension structure. The second lever 133 extends the reach between the second pedal 132 and the second pivot pin 134 such that the second resistance pedal 131 can be rotated by the foot of the patient 104.

The second pivot pin 134 is a prism-shaped structure. The second pivot pin 134 is a rotating structure. The second pivot pin 134 rotates such that the center axis of the prism structure of the second pivot pin 134 aligns with the axis of rotation of the second pivot pin 134. The congruent end of the prism structure of the second lever 133 that is distal from the second pedal 132 attaches radially to the lateral face of the second pivot pin 134 such that the second lever 133 rotates relative to the bench 111 with the rotation of the second pivot pin 134.

The second resistance structure 135 is a mechanical structure. The second resistance structure 135 comprises a second motor 152, a second spool 211, and a second cable 212. The second spool 211 secures the second cable 212 to the second motor 152. The second motor 152 rotates the second spool 211 such that the second cable 212 is deployed from and retracted onto the second spool 211. The second motor 152 maintains a tension on the second cable 212 that generates the counterforce applied to the second resistance pedal 131.

The second mounting structure 136 is a mechanical structure. The second mounting structure 136 physically attaches the second pivot pin 134 and the second resistance structure 135 to the inferior surface 116 of the bench 111. The second mounting structure 136 attaches the second pivot pin 134 to the second lever 133 such that the second lever 133 rotates freely within the second mounting structure 136.

The second override winch 137 is a manually operated winch. The winch is defined elsewhere in this disclosure. The second override winch 137 operates in parallel with the second resistance structure 135 such that the second override winch 137 can take over in the event of the failure of the second resistance structure 135. In this circumstance, the tension provided by the second resistance structure 135 is manually transferred to the second override winch 137 before the second resistance structure is removed from the load path of the second resistance pedal 131. The second override winch 137 then manually operated to prevent rapid changes in the counterforce provided to the second resistance pedal 131.

The assistance circuit 103 is an electric circuit. The assistance circuit 103 generates the counterforce presented to the patient 104 during the therapeutic process. The assistance circuit 103 generates an audible alarm. The assistance circuit allows a patient 104 to actuate the audible alarm. The assistance circuit 103 is an independently powered electric circuit. By independently powered is meant that the assistance circuit 103 can operate without an electrical connection to an external power source. The assistance circuit 103 comprises a plurality of motors 141, a buzzer 142, a plurality of switches 143, and a power circuit 144. The plurality of motors 141, the buzzer 142, the plurality of switches 143, and the power circuit 144 are electrically interconnected.

Each of the plurality of motors 141 is an electrically powered device that converts electric energy into rotational energy. Each of the plurality of motors 141 maintains a counterforce use by the patient 104 during the therapeutic process. Each of the plurality of motors 141 mounts underneath the bench 111 of the seat 101. The plurality of motors 141 draw electrical energy from the power circuit 144.

The buzzer 142 is a transducer. The buzzer 142 is an electrical device that converts electrical energy into an audible sound. The buzzer 142 draws electrical energy from the power circuit 144. The patient 104 actuates the buzzer 142 as an audible alarm to indicate that the patient 104 is in distress.

Each of the plurality of switches 143 is an electrical switch. Each of the plurality of switches 143 forms a series electric connection between the power circuit 144 and a circuit element selected from the group consisting of the buzzer 142 and a motor selected from the plurality of motors 141. Each of the plurality of switches 143 controls the flow of electricity from the power circuit 144 to the selected circuit element.

The power circuit 144 is an electrical circuit. The power circuit 144 powers the operation of the assistance circuit 103. The power circuit 144 is an electrochemical device. The power circuit 144 converts chemical potential energy into the electrical energy required to power the assistance circuit 103.

The plurality of motors 141 comprises a first motor 151 and a second motor 152. The first motor 151 is the motor selected from the plurality of motors 141 that provides the counterforce to the first resistance structure 125. The second motor 152 is the motor selected from the plurality of motors 141 that provides the counterforce to the second resistance structure 135.

The plurality of switches 143 comprises a first switch 161, a second switch 162, and an alarm switch 163. The first switch 161 is a maintained switch. The first switch 161 controls the operation of the first motor 151. The second switch 162 is a maintained switch. The second switch 162 controls the operation of the second motor 152. The alarm switch 163 is a momentary switch. The alarm switch 163 controls the operation of the buzzer 142.

The following definitions were used in this disclosure:

Alarm: As used in this disclosure, an alarm refers to a signal used to indicate the occurrence of an event.

Align: As used in this disclosure, align refers to an arrangement of objects that are: 1) arranged in a straight plane or line; 2) arranged to give a directional sense of a plurality of parallel planes or lines; or, 3) a first line or curve is congruent to and overlaid on a second line or curve.

Backrest: As used in this disclosure, a backrest is a vertical or vertically canted supporting surface formed in a chair or seat.

Battery: As used in this disclosure, a battery is a chemical device consisting of one or more cells, in which chemical energy is converted into electricity and used as a source of power. Batteries are commonly defined with a positive terminal and a negative terminal.

Bench: As used in this disclosure, a bench is a horizontal supporting surface formed by a seat.

Buzzer: As used in this disclosure, a buzzer is two lead electrical device that generates an audible sound when voltage is applied to the two leads.

Center: As used in this disclosure, a center is a point that is: 1) the point within a circle that is equidistant from all the points of the circumference; 2) the point within a regular polygon that is equidistant from all the vertices of the regular polygon; 3) the point on a line that is equidistant from the ends of the line; 4) the point, pivot, or axis around which something revolves; or, 5) the centroid or first moment of an area or structure. In cases where the appropriate definition or definitions are not obvious, the fifth option should be used in interpreting the specification.

Center Axis: As used in this disclosure, the center axis is the axis of a cylinder or a prism. The center axis of a prism is the line that joins the center point of the first congruent face of the prism to the center point of the second corresponding congruent face of the prism. The center axis of a pyramid refers to a line formed through the apex of the pyramid that is perpendicular to the base of the pyramid. When the center axes of two cylinder, prism or pyramidal structures share the same line they are said to be aligned. When the center axes of two cylinder, prism or pyramidal structures do not share the same line they are said to be offset.

Center of Rotation: As used in this disclosure, the center of rotation is the point of a rotating plane that does not move with the rotation of the plane. A line within a rotating three-dimensional object that does not move with the rotation of the object is also referred to as an axis of rotation.

Collapsible: As used in this disclosure, the terms collapsible refers to an object that is configured such that the volume of the object is adjustable. The verb collapse means that the volume of the object is adjusted from a larger volume to a smaller volume. The verbs expand and deploy mean that the volume of the object is adjusted from a smaller volume to a larger volume.

Composite Prism: As used in this disclosure, a composite prism refers to a structure that is formed from a plurality of structures selected from the group consisting of a prism structure and a pyramid structure. The plurality of selected structures may or may not be truncated. The plurality of prism structures are joined together such that the center axes of each of the plurality of structures are aligned. The congruent ends of any two structures selected from the group consisting of a prism structure and a pyramid structure need not be geometrically similar.

Congruent: As used in this disclosure, congruent is a term that compares a first object to a second object. Specifically, two objects are said to be congruent when: 1) they are geometrically similar; and, 2) the first object can superimpose over the second object such that the first object aligns, within manufacturing tolerances, with the second object.

Control Circuit: As used in this disclosure, a control circuit is an electrical circuit that manages and regulates the behavior or operation of a device.

Correspond: As used in this disclosure, the term correspond is used as a comparison between two or more objects wherein one or more properties shared by the two or more objects match, agree, or align within acceptable manufacturing tolerances.

Diode: As used in this disclosure, a diode is a two terminal semiconductor device that allows current flow in only one direction. The two terminals are called the anode and the cathode. Electric current is allowed to pass from the anode to the cathode.

Disk: As used in this disclosure, a disk is a prism-shaped object that is flat in appearance. The disk is formed from two congruent ends that are attached by a lateral face. The sum of the surface areas of two congruent ends of the prism-shaped object that forms the disk is greater than the surface area of the lateral face of the prism-shaped object that forms the disk. In this disclosure, the congruent ends of the prism-shaped structure that forms the disk are referred to as the faces of the disk.

Elevation: As used in this disclosure, elevation refers to the span of the distance in the superior direction between a specified horizontal surface and a reference horizontal surface. Unless the context of the disclosure suggest otherwise, the specified horizontal surface is the supporting surface the potential embodiment of the disclosure rests on. The infinitive form of elevation is to elevate.

Extension Structure: As used in this disclosure, an extension structure is an inert physical structure that is used to extend or bridge the reach between any two objects.

External Power Source: As used in this disclosure, an external power source is a source of the energy that is externally provided to enable the operation of the present disclosure. Examples of external power sources include, but are not limited to, electrical power sources and compressed air sources.

Force of Gravity: As used in this disclosure, the force of gravity refers to a vector that indicates the direction of the pull of gravity on an object at or near the surface of the earth.

Forward: As used in this disclosure, forward is term that relates a first object to a second object. When the first object is closer to the bow of a vehicle, the first object is said to be forward of the second object. The term is commonly used on vessels and vehicles. See bow, aft, port, starboard, and stern Form Factor: As used in this disclosure, the term form factor refers to the size and shape of an object.

Geometrically Similar: As used in this disclosure, geometrically similar is a term that compares a first object to a second object wherein: 1) the sides of the first object have a one to one correspondence to the sides of the second object; 2) wherein the ratio of the length of each pair of corresponding sides are equal; 3) the angles formed by the first object have a one to one correspondence to the angles of the second object; and, 4) wherein the corresponding angles are equal. The term geometrically identical refers to a situation where the ratio of the length of each pair of corresponding sides equals 1.

Horizontal: As used in this disclosure, horizontal is a directional term that refers to a direction that is either: 1) parallel to the horizon; 2) perpendicular to the local force of gravity, or, 3) parallel to a supporting surface. In cases where the appropriate definition or definitions are not obvious, the second option should be used in interpreting the specification. Unless specifically noted in this disclosure, the horizontal direction is always perpendicular to the vertical direction.

Inferior: As used in this disclosure, the term inferior refers to a directional reference that is parallel to and in the same direction as the force of gravity when an object is positioned or used normally.

Maintained Switch: A used in this disclosure, a maintained switch is a switch that maintains the position that was set in the most recent switch actuation. A maintained switch works in an opposite manner to a momentary switch.

Momentary Switch: As used in this disclosure, a momentary switch is a biased switch in the sense that the momentary switch has a baseline position that only changes when the momentary switch is actuated (for example when a pushbutton switch is pushed or a relay coil is energized). The momentary switch then returns to the baseline position once the actuation is completed. This baseline position is called the "normal" position. For example, a "normally open" momentary switch interrupts (open) the electric circuit in the baseline position and completes (closes) the circuit when the momentary switch is activated. Similarly, a "normally closed" momentary switch will complete (close) an electric circuit in the baseline position and interrupt (open) the circuit when the momentary switch is activated.

Not Significantly Different: As used in this disclosure, the term not significantly different compares a specified property of a first object to the corresponding property of a reference object (reference property). The specified property is considered to be not significantly different from the reference property when the absolute value of the difference between the specified property and the reference property is less than 10.0% of the reference property value. A negligible difference is considered to be not significantly different.

One to One: When used in this disclosure, a one to one relationship means that a first element selected from a first set is in some manner connected to only one element of a second set. A one to one correspondence means that the one to one relationship exists both from the first set to the second set and from the second set to the first set. A one to one fashion means that the one to one relationship exists in only one direction.

Orientation: As used in this disclosure, orientation refers to the positioning of a first object relative to: 1) a second object; or, 2) a fixed position, location, or direction.

Patient: As used in this disclosure, a patient is a person who is designated to receive a medical treatment, therapy or service. The term patient may be extended to an animal when used within the context of the animal receiving veterinary treatment or services.

Perimeter: As used in this disclosure, a perimeter is one or more curved or straight lines that bounds an enclosed area on a plane or surface. The perimeter of a circle is commonly referred to as a circumference.

Pivot: As used in this disclosure, a pivot is a rod or shaft around which an object rotates or swings.

Plug: As used in this disclosure, a plug is an electrical termination that electrically connects a first electrical circuit to a second electrical circuit or a source of electricity. As used in this disclosure, a plug will have two or three metal pins.

Port: As used in this disclosure, a port is an electrical termination that is used to connect a first electrical circuit to a second external electrical circuit. In this disclosure, the port is designed to receive a plug.

Prism: As used in this disclosure, a prism is a three-dimensional geometric structure wherein: 1) the form factor of two faces of the prism are congruent; and, 2) the two congruent faces are parallel to each other. The two congruent faces are also commonly referred to as the ends of the prism. The surfaces that connect the two congruent faces are called the lateral faces. In this disclosure, when further description is required a prism will be named for the geometric or descriptive name of the form factor of the two congruent faces. If the form factor of the two corresponding faces has no clearly established or well-known geometric or descriptive name, the term irregular prism will be used. The center axis of a prism is defined as a line that joins the center point of the first congruent face of the prism to the center point of the second corresponding congruent face of the prism. The center axis of a prism is otherwise analogous to the center axis of a cylinder. A prism wherein the ends are circles is commonly referred to as a cylinder.

Radial: As used in this disclosure, the term radial refers to a direction that: 1) is perpendicular to an identified central axis; or, 2) projects away from a center point.

Reach: As used in this disclosure, reach refers to a span of distance between any two objects.

Recline: As used in this disclosure, recline refers to a person who lies backwards with the back supported. A person in such a position is said to be in a reclined position. Alternatively, recline may refer to a seat or chair wherein the back of the seat is in a sloped position such that a person sitting in the seat is in a reclined position. Such a seat or chair is often referred to as a reclining chair or a reclining seat.

Relaxed Shape: As used in this disclosure, a structure is considered to be in its relaxed state when no shear, strain, or torsional forces are being applied to the structure.

Resistance: As used in this disclosure, resistance refers to the opposition provided by an electrical circuit (or circuit element) to the electrical current created by a DC voltage is presented across the electrical circuit (or circuit element). The term impedance is often used for resistance when referring to an AC voltage that is presented across the electrical circuit (or circuit element).

Resistor: As used in this disclosure, a resistor is a well-known and commonly available electrical device that presents a resistance that inhibits the flow of electricity through an electric circuit. Within an electric circuit processing alternating currents, the resistor will not affect the phase of the alternating current. A current flowing through a resistor will create a voltage across the terminals of the resistor.

Rigid Structure: As used in this disclosure, a rigid structure is a solid structure formed from an inelastic material that resists changes in shape. A rigid structure will permanently deform as it fails under a force. See bimodal flexible structure.

Rotation: As used in this disclosure, rotation refers to the cyclic movement of an object around a fixed point or fixed axis. The verb of rotation is to rotate.

Roughly: As used in this disclosure, roughly refers to a comparison between two objects. Roughly means that the difference between one or more parameters of the two compared objects are not significantly different.

Seat: As used in this disclosure, a seat is a structure that a person can sit on. Chair is a common synonym for a seat.

Series Circuit: As used in this disclosure, a series circuit refers to a method of electrically connecting a plurality of circuit elements to a voltage source. In a series circuit, the proportion of the voltage received by each individual circuit element is divided proportionally between the plurality circuit elements based on the resistance (or impedance) of each circuit element relative to the total resistance of the plurality of circuit elements. The series circuit forms a linear or loop structure often referred to as a daisy chain.

Superior: As used in this disclosure, the term superior refers to a directional reference that is parallel to and in the opposite direction of the force of gravity when an object is positioned or used normally.

Switch: As used in this disclosure, a switch is an electrical device that starts and stops the flow of electricity through an electric circuit by completing or interrupting an electric circuit. The act of completing or breaking the electrical circuit is called actuation. Completing or interrupting an electric circuit with a switch is often referred to as closing or opening a switch respectively. Completing or interrupting an electric circuit is also often referred to as making or breaking the circuit respectively.

Telescopic: As used in this disclosure, telescopic is an adjective that describes a composite prism structure made of hollow prism-shaped sections that fit or slide into each other such that the composite prism structure can be made longer or shorter by adjusting the relative positions of the hollow prism-shaped sections.

Therapeutic: As used in this disclosure, therapeutic is an adjective that refers to a medical, ameliorative, or hygienic substance, process, or procedure.

Therapeutic Chair: As used in this disclosure, a therapeutic chair is a reclining furniture item that is intended for use with a patient. The angle at which the therapeutic chair reclines is often adjustable.

Transducer: As used in this disclosure, a transducer is a device that converts a physical quantity, such as pressure or brightness into an electrical signal or a device that converts an electrical signal into a physical quantity.

Vertical: As used in this disclosure, vertical refers to a direction that is either: 1) perpendicular to the horizontal direction; 2) parallel to the local force of gravity; or, 3) when referring to an individual object the direction from the designated top of the individual object to the designated bottom of the individual object. In cases where the appropriate definition or definitions are not obvious, the second option should be used in interpreting the specification. Unless specifically noted in this disclosure, the vertical direction is always perpendicular to the horizontal direction.

Wheelchair: As used in this disclosure, a wheelchair is a chair fitted with two large and two small wheels. The wheelchair is commonly used for sick or disabled persons.

Winch: As used in this disclosure, a winch is a device that comprises a looped cord and a rotating spool. The cord is rotated by the spool. The rotating spool of the winch rotates the looped cord such that the looped cord will transfer the rotating energy provided by the winch to an object around which the looped cord is wrapped.

With respect to the above description, it is to be realized that the optimum dimensional relationship for the various components of the invention described above and in FIGS. 1 through 4 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. A therapy wheelchair comprising a seat, a plurality of resistance pedals, and an assistance circuit;

wherein the plurality of resistance pedals and the assistance circuit attaches to the seat;

wherein each resistance pedal selected from the plurality of resistance pedals attaches to an inferior surface of a bench of the seat such that the selected resistance pedal rotates relative to the bench;

wherein the plurality of resistance pedals comprises a first resistance pedal and a second resistance pedal;

wherein the first resistance pedal is a mechanical device;

wherein the first resistance pedal attaches to the inferior surface of the bench of the seat;

wherein the first resistance pedal is adapted for use by a patient during the therapeutic process;

wherein the first resistance pedal rotates relative to the bench;

wherein the patient rotates the first resistance pedal during the therapeutic process;

wherein the second resistance pedal is a mechanical device;

wherein the second resistance pedal attaches to the inferior surface of the bench of the seat;

wherein the second resistance pedal is adapted for use by the patient during the therapeutic process;

wherein the second resistance pedal rotates relative to the bench;

wherein the patient rotates the second resistance pedal during the therapeutic process.

2. The therapy wheelchair according to claim 1 wherein the therapy wheelchair is adapted for use with the patient;

wherein the therapy wheelchair is an exercise device;

wherein the patient sits in the therapy wheelchair to exercise;

wherein the therapy wheelchair provides a counterforce for use by the patient during leg exercises;

wherein the patient moves the plurality of resistance pedals.

3. The therapy wheelchair according to claim 2 wherein the seat forms the wheelchair;

wherein the plurality of resistance pedals provides a counterforce against the movement by the patient;

wherein the assistance circuit is an electric circuit;

wherein the assistance circuit controls the counterforces provided the patient during the leg exercises;

wherein the assistance circuit generates an audible alarm.

4. The therapy wheelchair according to claim 3 wherein each of the plurality of resistance pedals is a rotating structure;

wherein each of the plurality of resistance pedals generates a counterforce;

wherein the patient rotates each of the plurality of resistance pedals during the therapeutic process;

wherein each of the plurality of resistance pedals presents the counterforce to the patient as the patient rotates the plurality of resistance pedals during the therapeutic process.

5. The therapy wheelchair according to claim 4 wherein the assistance circuit is an electric circuit;

wherein the assistance circuit generates the counterforce presented to the patient during the therapeutic process;

wherein the assistance circuit allows a patient to actuate the audible alarm;

wherein the assistance circuit is an independently powered electric circuit;

wherein by independently powered is meant that the assistance circuit can operate without an electrical connection to an external power source.

6. The therapy wheelchair according to claim 5 wherein the seat comprises a bench, a backrest, and a plurality of armrests;
wherein the backrest attaches to the bench;
wherein the plurality of armrests attaches to the bench.

7. The therapy wheelchair according to claim 6 wherein the bench forms a horizontally oriented surface;
wherein the patient sits on the bench during the therapeutic process;
wherein the bench is adapted to elevate the patient such that the patient can rotate the plurality of resistance pedals during the therapeutic process.

8. The therapy wheelchair according to claim 7 wherein the bench further comprises a superior surface and an inferior surface;
wherein the superior surface is positioned opposite from the inferior surface about the bench.

9. The therapy wheelchair according to claim 8 wherein the backrest is a vertically oriented structure;
wherein the backrest is adapted to support the back of the patient when the patient sits in the seat;
wherein the backrest provides the patient with a surface to push against during the therapeutic process.

10. The therapy wheelchair according to claim 9 wherein each of the plurality of armrests is a horizontally-oriented structure;
wherein each of the plurality of armrests has a perpendicular orientation relative to the backrest;
wherein the plurality of armrests is adapted to support the arms of the patient when the patient sits in the seat;
wherein the plurality of armrests provides the patient with a surface to push against during the therapeutic process.

11. The therapy wheelchair according to claim 10 wherein the assistance circuit comprises a plurality of motors, a buzzer, a plurality of switches, and a power circuit;
wherein the plurality of motors, the buzzer, the plurality of switches, and the power circuit are electrically interconnected.

12. The therapy wheelchair according to claim 11 wherein the plurality of motors comprises a first motor and a second motor;
wherein the first motor is the motor selected from the plurality of motors that provides the counterforce to the first resistance structure;
wherein the second motor is the motor selected from the plurality of motors that provides the counterforce to the second resistance structure.

13. The therapy wheelchair according to claim 12 wherein the first resistance pedal comprises a first pedal, a first lever, a first pivot pin, a first resistance structure, a first mounting structure, and a first override winch;
wherein the first resistance structure of the first resistance pedal generates the counterforce that opposes the rotation of the first resistance pedal by the patient during the therapeutic process;
wherein the first pedal is a rigid structure;
wherein the first pedal is sized to receive the foot of the patient;
wherein the patient rotates the first resistance pedal by pressing the foot against the first pedal;
wherein the first pedal forms a rigid structure with the first lever;
wherein the first pedal attaches to the end of the first lever that is distal from the first pivot pin;
wherein the first lever is a rigid structure;
wherein the first pedal attaches to a congruent end of the first lever, wherein the first pedal is positioned perpendicular with a center axis of the first lever;
wherein the first lever attaches the first pivot pin to the first pedal;
wherein the first lever attaches to the first pivot pin such that the first lever and the first pedal rotate relative to the bench;
wherein the first lever forms an extension structure;
wherein the first lever extends the reach between the first pedal and the first pivot pin such that the first resistance pedal can be rotated by the foot of the patient;
wherein the first pivot pin is a rotating structure;
wherein the first pivot pin rotates such that a center axis of the first pivot pin aligns with the axis of rotation of the first pivot pin;
wherein the congruent end of the first lever that is distal from the first pedal attaches to the lateral face of the first pivot pin such that the first lever rotates relative to the bench with the rotation of the first pivot pin;
wherein the first resistance structure is a mechanical structure;
wherein the first resistance structure comprises a first motor, a first spool, and a first cable;
wherein the first spool secures the first cable to the first motor;
wherein the first motor rotates the first spool such that the first cable is deployed from and retracted onto the first spool;
wherein the first motor maintains a tension on the first cable that generates the counterforce applied to the first resistance pedal;
wherein the first mounting structure is a mechanical structure;
wherein the first mounting structure physically attaches the first pivot pin and the first resistance structure to the inferior surface of the bench;
wherein the first mounting structure attaches the first pivot pin to the first lever such that the first lever rotates freely within the first mounting structure;
wherein the first override winch is a manually operated winch;
wherein the first override winch operates in parallel with the first resistance structure such that the first override winch can take over in the event of the failure of the first resistance structure.

14. The therapy wheelchair according to claim 13 wherein the second resistance pedal comprises a second pedal, a second lever, a second pivot pin, a second resistance structure, a second mounting structure, and a second override winch;
wherein the second resistance structure of the second resistance pedal generates the counterforce that opposes the rotation of the second resistance pedal by the patient during the therapeutic process;
wherein the second pedal is a rigid structure;
wherein the second pedal is sized to receive the foot of the patient;
wherein the patient rotates the second resistance pedal by pressing the foot against the second pedal;
wherein the second pedal forms a rigid structure with the second lever;
wherein the second pedal attaches to the end of the second lever that is distal from the second pivot pin;
wherein the second lever is a rigid structure;

wherein the second pedal attaches to a congruent end of the second lever, wherein the second pedal is positioned perpendicular with a center axis of the second lever;

wherein the second lever attaches the second pivot pin to the second pedal;

wherein the second lever attaches to the second pivot pin such that the second lever and the second pedal rotate relative to the bench;

wherein the second lever forms an extension structure;

wherein the second lever extends the reach between the second pedal and the second pivot pin such that the second resistance pedal can be rotated by the foot of the patient;

wherein the second pivot pin is a rotating structure;

wherein the second pivot pin rotates such that a center axis of the second pivot pin aligns with the axis of rotation of the second pivot pin;

wherein the congruent end of the second lever that is distal from the second pedal attaches radially to the lateral face of the second pivot pin such that the second lever rotates relative to the bench with the rotation of the second pivot pin;

wherein the second resistance structure is a mechanical structure;

wherein the second resistance structure comprises a second motor, a second spool, and a second cable;

wherein the second spool secures the second cable to the second motor;

wherein the second motor rotates the second spool such that the second cable is deployed from and retracted onto the second spool;

wherein the second motor maintains a tension on the second cable that generates the counterforce applied to the second resistance pedal;

wherein the second mounting structure is a mechanical structure;

wherein the second mounting structure physically attaches the second pivot pin and the second resistance structure to the inferior surface of the bench;

wherein the second mounting structure attaches the second pivot pin to the second lever such that the second lever rotates freely within the second mounting structure;

wherein the second override winch is a manually operated winch;

wherein the second override winch operates in parallel with the second resistance structure such that the second override winch can take over in the event of the failure of the second resistance structure;

wherein in this circumstance, the tension provided by the second resistance structure is manually transferred to the second override winch before the second resistance structure is removed from the load path of the second resistance pedal;

wherein the second override winch then manually operated to prevent rapid changes in the counterforce provided to the second resistance pedal.

15. The therapy wheelchair according to claim 14 wherein each of the plurality of switches is an electrical switch;

wherein each of the plurality of switches forms a series electric connection between the power circuit and a circuit element selected from the group consisting of the buzzer and a motor selected from the plurality of motors;

wherein each of the plurality of switches controls the flow of electricity from the power circuit to the selected circuit element.

16. The therapy wheelchair according to claim 15 wherein the plurality of switches comprises a first switch, a second switch, and an alarm switch;

wherein the first switch is a maintained switch;

wherein the first switch controls the operation of the first motor;

wherein the second switch is a maintained switch;

wherein the second switch controls the operation of the second motor;

wherein the alarm switch is a momentary switch;

wherein the alarm switch controls the operation of the buzzer.

17. The therapy wheelchair according to claim 16 wherein each of the plurality of motors is an electrically powered device that converts electric energy into rotational energy;

wherein each of the plurality of motors maintains a counterforce use by the patient during the therapeutic process;

wherein each of the plurality of motors mounts underneath the bench of the seat;

wherein the plurality of motors draw electrical energy from the power circuit.

18. The therapy wheelchair according to claim 17 wherein the buzzer is a transducer;

wherein the buzzer is an electrical device that converts electrical energy into an audible sound;

wherein the buzzer draws electrical energy from the power circuit;

wherein the patient actuates the buzzer as an audible alarm.

19. The therapy wheelchair according to claim 18 wherein the power circuit is an electrical circuit;

wherein the power circuit powers the operation of the assistance circuit;

wherein the power circuit is an electrochemical device;

wherein the power circuit converts chemical potential energy into the electrical energy required to power the assistance circuit.

* * * * *